Nov. 15, 1949     R. A. BECKWITH     2,487,782
AUTOMATIC GEAR LUBRICATING MEANS

Filed July 17, 1945     2 Sheets-Sheet 1

INVENTOR.
R. A. Beckwith
BY

Nov. 15, 1949   R. A. BECKWITH   2,487,782
AUTOMATIC GEAR LUBRICATING MEANS
Filed July 17, 1945

INVENTOR.
R. A. Beckwith
BY Robbs Cobb
Attorneys.

Patented Nov. 15, 1949

2,487,782

UNITED STATES PATENT OFFICE 2,487,782

AUTOMATIC GEAR LUBRICATING MEANS

Raymond A. Beckwith, Milwaukee, Wis., assignor to Koehring Company, Milwaukee, Wis., a corporation Application July 17, 1945, Serial No. 605,518

3 Claims. (Cl. 184—13)

The object of this invention has been to devise simple lubricating means designed primarily for what are usually known as open gear trains, or gear trains which are not ordinarily submerged in oil or a lubricating medium for the lubricating thereof.

The lubrication of slow speed open gear trains is usually effected by applying heavy grease to the gears by the use of wooden paddles, or applying oil to the gears from oil cans, the applications being made periodically. Obviously between the greasing periods the gears will operate until the grease or lubricant has partially worn off or has been thrown off by the rotation of the gears, and if this period is allowed to continue too long by oversight or otherwise, the gears are subjected to cutting and excessive wear until again lubricated.

A special object of this invention, therefore, has been to do away with the difficulty experienced heretofore as above pointed out in reference to the common method of manually lubricating gears, and to provide means whereby the gears will be continuously lubricated from a lubricant supply reservoir which may be replenished at intervals of considerable length.

A full understanding of the improvements of my present invention will be had upon reference to the following detail description in conjunction with the accompanying drawings, in which.

Figure 1:
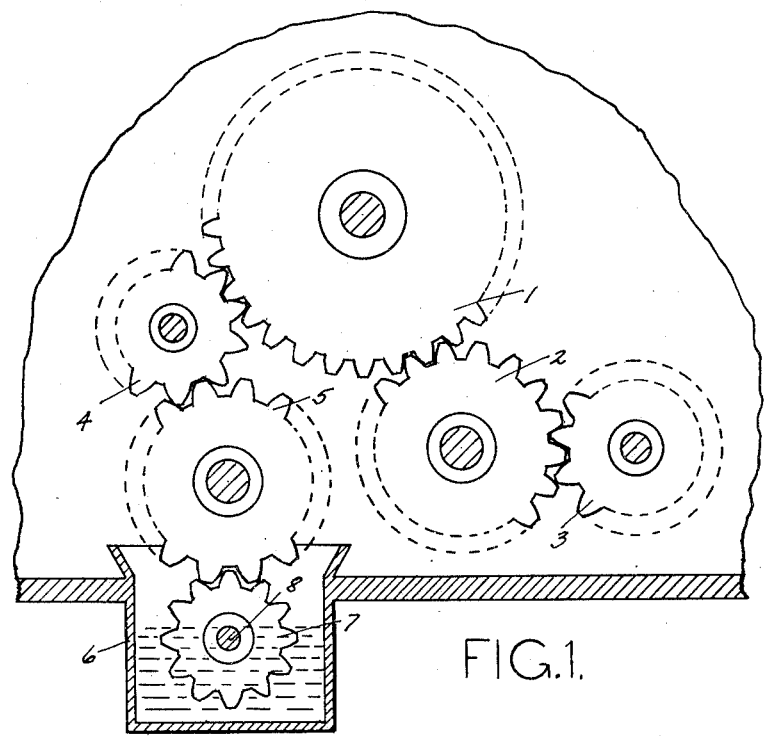
Figure 1 is a view in side elevation showing what is usually known as an open gear train comprising a series of meshing vertical gears, and showing the application of my invention thereto.

I shall first refer to the construction in Figures 1 to 5. According to this construction the open gear train is comprised of the series of meshing spur gears 1, 2, 3, 4, and 5. This gear train is usually mounted in an open and accessible manner in the frame of the machine which is designed to be provided with one or more of such trains for driving and usual gear transmission purposes. The lubricating means employed is comprised of a reservoir or container 6, the upper portion of which partially shrouds the periphery of the transmission gear 5. In the reservoir 6, which will be filled about two-thirds full of lubricant, is mounted the thin lubricating pinion 7 carried by a short shaft 8 supported in suitable bearings in the walls of the reservoir 6. The lubricating gear 7 has its teeth in mesh with the teeth of the transmission gear 5, and is therefore rotated during the operation of the gears of the gear train. The rotation of the lubricating gear 7, by reason of the fact that the lower portion of said gear is submerged in the grease or oil in the lubricating reservoir, causes the lubricant to be lifted by the gear 7 and deposited constantly in small amounts upon the teeth of the gear 5. The deposits of oil on the teeth of the gear 5 are carried up and deposited in turn on the pinion 4, and, in similar manner, the lubricant is carried from the pinion 4 to the teeth of the gear 1, and from the teeth of the latter gear to the teeth of the gear 2, and thence on to the teeth of the gear 3. The meshing teeth of the various gears tend to spread the lubricant over the entire length of the teeth, and in this manner there is a continuation of the flow of the lubricant from the reservoir 6 to the various gears as described.

Experience in the operation of my lubricating means has proven that after the teeth of the various gears become well lubricated, the amount of lubricant deposited on the first gear by the thin lubricating gear 7 decreases and therefore a uniform amount of lubricant is carried to the teeth of the various gears from the reservoir 6 in an automatic manner. If the gears work hard and burn up some of the lubricant, the gear 7 tends to supply lubricant in increasing amounts to the meshing gear 5. On the other hand if the gear train is running under a light load, there is no accumulation of excess of lubricant upon the teeth of the gears above a proper amount such as is required to effect the thorough lubrication of these members.

Figures 2, 3, 4, 5:
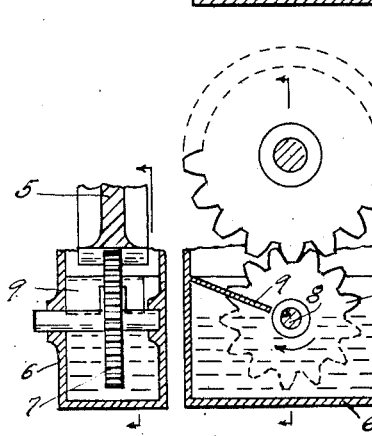
Figure 2 is a fragmentary vertical sectional view taken through the oil reservoir and showing the cooperation between the lubricating gear and one of the gears of the main gear train.
Figure 3 is an enlarged detail view of a sectional nature, the section taken at right angles to the view of Figure 2, namely through the oil or lubricant reservoir, and bringing out more clearly the detail construction of the lubricating gear and wiper or baffle associated therewith.
Figure 4 is a view similar to Figure 2, but illustrating a modified embodiment of the invention wherein a lubricating gear having interrupted teeth is employed.
Figure 5 is a view similar to Figure 3, illustrating the modification of Figure 4, somewhat more clearly.

As shown in Figure 3 of the drawings, I contemplate the provision of a baffle or wiper plate 9 which is bifurcated so as to permit the lubricating gear 7 to operate through the bifurcated portion, and this plate is utilized to eliminate possibility of an excessive amount of lubricant being carried up by the gear 7 and deposited upon the teeth of the gear 5.

In certain instances where the amount of the lubricating requirements for a set of gears in a gear train are less than they may be in reference to the train illustrated in Figure 1, I may employ a modified arrangement of and form of lubricating gear as illustrated in Figures 4 and 5 of my drawings. As seen most clearly in Figure 4, I provide an extra gear 10 which is primarily a driving gear and supported in the drive chamber 13 of the reservoir or oil container 11. The reservoir 11 is divided into the dry chamber and a lubricant chamber by means of a partition 12. The gear 10 operating in the dry chamber designated 13 is keyed to a shaft 15 which is mounted to pass through the dry and lubricant chambers, and drives the lubricating segment gear 14 which is a simple interrupted gear, effectively speaking, provided with only two teeth, as illustrated in Figure 5. Since the gear 10 and segment gear 14 are both keyed to the shaft 15, it will be apparent that the two gear members are driven by the turning of the gear 5a, which is one of the gears of the gear train to be lubricated and corresponds with the gear 5 as shown in Figure 1. Obviously, a gear segment member such as the member 14 having two teeth and of a size corresponding with the gear 7 first described, will provide one-sixth of the lubricating action or effect as would the gear 7 having twelve teeth. Thus, by regulating the number of the teeth of the gear member 14, a differential in the amount of lubricant supplied to the gear train is obtainable, the same to be governed by the amount of lubricant desired to be carried up from the lubricant reservoir to the gear train. By reason of the gear members 10 and 14 being simultaneously rotated and by reason of the fact that their gear teeth are alined with one another, the teeth of the gear 14 will properly mesh with the teeth of the gear 5a incident to the rotation of the gear 14 by means of the gear 10 acting as a driver therefor.

The reservoir 6 or the reservoir chamber 11, may, if desired, be provided with covering members having openings therethrough and thus permit of the replenishment of the lubricant therein by means of grease guns, should this expedient be desired to be practiced. Under these conditions, the covering of the lubricant chambers eliminates possibility of dust and flying particles commonly found around the equipment using open gear trains from entering the chambers containing the lubricant. Also, under these conditions, since it is not necessary to any longer manually apply lubricant to the gears of the open gear train by paddles or using oil cans, it is possible to supply for the open gear train light metal enclosures to enable the gears to be maintained clean, and such provision may be a desideratum for many types of machine units such as shovels, cranes, and draglines, with which my invention is capable of being used.

In the practical use of lubricating means as set forth above, it has been found under test that with one pound of gear lubricant deposited in a reservoir such as indicated at 6 in my drawings, proper lubrication of a gear train such as illustrated, for a period of over 52 hours has been obtained without necessity of replenishment of lubricant in the reservoir.

Figure 6:
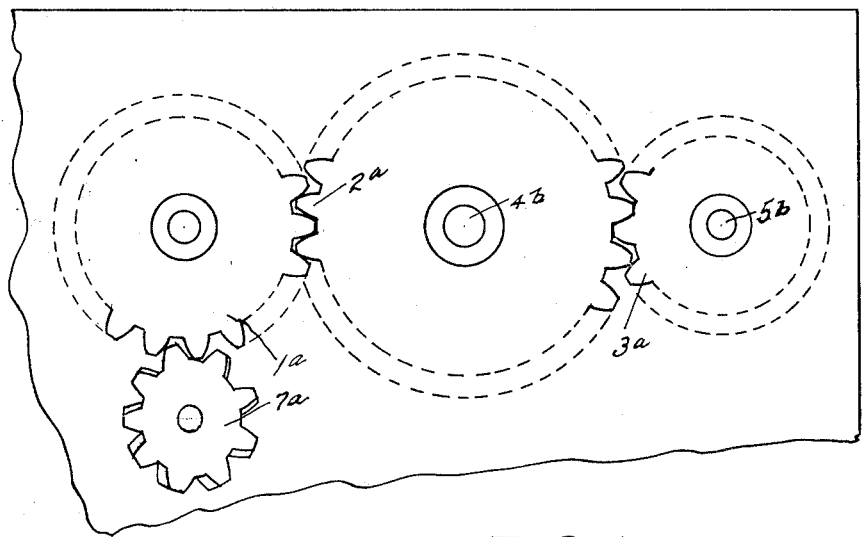
Figure 6 is a top plan view illustrating an open gear train in which the gears are disposed horizontally the lubricant being supplied to the gear train by means of a lubricating gear disposed at an angle to the horizontal with its uppermost teeth in mesh with one of the horizontal gears of the train.
Figure 7:
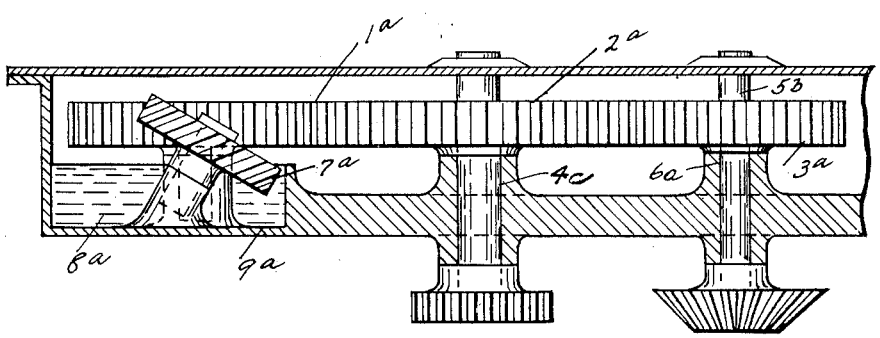
Figure 7 is a side elevation of the construction of the modification in Figure 6, but partially broken away at the oil reservoir to show more clearly the disposition and operation of the lubricating gear.

I next refer to the modification of my invention which is illustrated in Figures 6 and 7 of my drawings. In Figure 6 I show in top plan view a series of transmission gears of a gear train, the same designated 1a, 2a, and 3a. As stated, these gears lie in a horizontal plane, and the gears 2a and 3a are mounted upon shafts 4a and 5b, respectively, these shafts being designed to operate gears carried at the lower ends thereof, as shown. The gear 2a, in the illustration of this modification of my invention, may operate the swing pinion of a shovel, and ordinarily the swing pinion cannot be submerged in oil for lubricating purposes because of the incidental leakage around the vertical shaft 4b at the point designated 4c. This same difficulty is experienced in reference to the vertical shaft 5b in relation to the point of leakage which would exist at the point 6a.

Under the foregoing conditions, there is need, obviosly, for some pratical means for supplying the gears 2a and 3a with lubricant in some other manner than by submergence of said gears in the lubricant bath itself.

With the foregoing in view I provide in this construction of my invention the lubricating pinion 7a which is inclined at an angle to the vertical and which is formed with specially cut gear teeth enabling the teeth at the uppermost portion of the gear to remain in constant mesh with the teeth of the gear 1a. This lubricating gear 7a is of course provided with an inclined axis shaft mounted in a suitable bearing within the lubricant reservoir or chamber 9a which contains the oil or lubricant 8a. The top level of the lubricant 8a in the sump or chamber 9a will be just below the lower base of the gear 1a.

The last described modification of the invention affords a lubricating means for horizontal gears having all the advantages of the construction which is described in reference to the first form of my invention illustrated in Figures 1 to 5 inclusive.

I use the term "open gear train" in this description in a sort of relative sense to distinguish such gear trains from the trains which are closed and submerged in oil or lubricant chambers, the foregoing notwithstanding the fact that open gear trains may be lubricated by my invention and light metal covers applied thereto simply as protecting covering means to prevent lodgment of dirt or foreign matter in the gears. This latter is facilitated by the employment of the particular kind of lubricating means which I have developed as a part of my invention described.

Having thus described my invention, what I claim as new and desire to secure by Letters Patent of the United States, is—

1. In combination with a driving gear, lubricating means including a reservoir divided into a dry chamber and a lubricant containing chamber, a transmitting gear in the dry chamber and in mesh with the driving gear, a lubricating gear in the lubricant chamber and having teeth thereof adapted to contact the lubricant in the chamber and also movable to contact the teeth of the driving gear, and a connection between the transmitting and lubricating gears for actuating the lubricating gear.

2. The combination set forth in claim 1, wherein the teeth of the lubricating gear periphery are interrupted.

3. The combination set forth in claim 1, wherein the teeth of the lubricating gear periphery are arranged to only intermittently contact the driving gear.

RAYMOND A. BECKWITH.

REFERENCES CITED

The following references are of record in the file of this patent:

UNITED STATES PATENTS

| Number | Name | Date |
| --- | --- | --- |
| 1,220,810 | Alquist | Mar. 27, 1917 |
| 1,402,281 | Brockway | Jan. 3, 1922 |
| 1,680,870 | Gardner | Aug. 14, 1928 |
| 1,920,134 | Teel | July 25, 1933 |
| 1,954,833 | Schwarzkopf | Apr. 17, 1934 |